Figure 1:
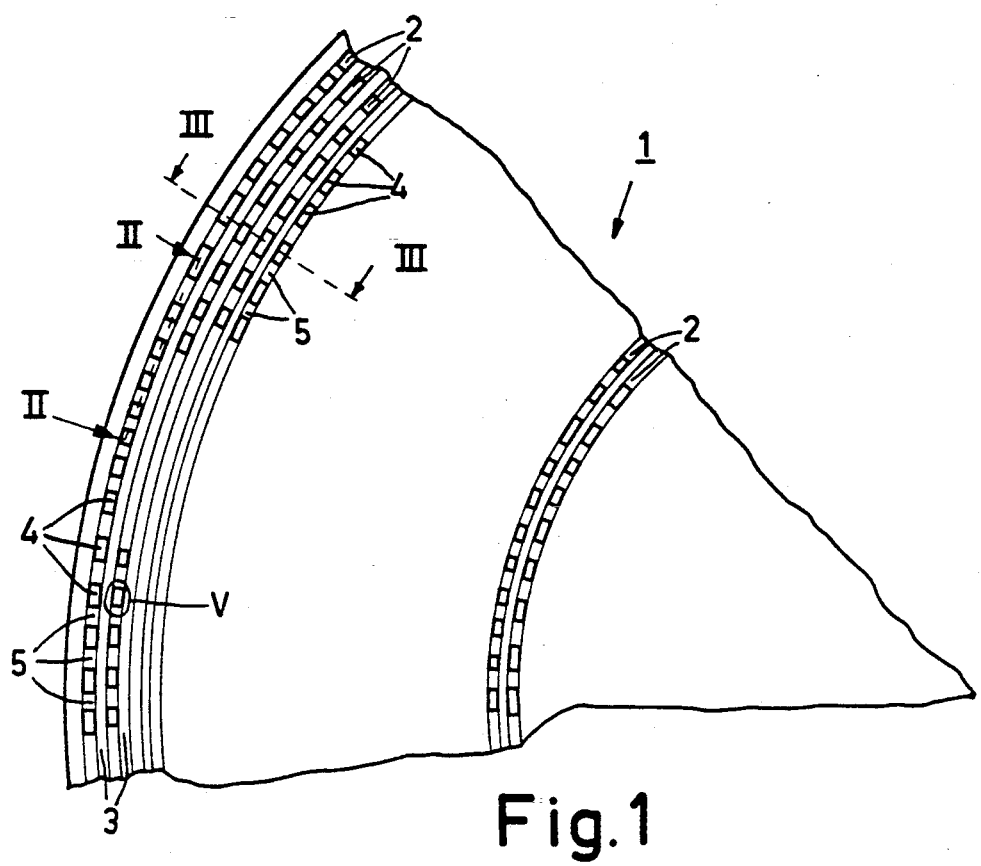

United States Patent [19]

Braat

[11] Patent Number: 5,168,490

[45] Date of Patent: * Dec. 1, 1992

[54] RECORD CARRIER WITH OPTICALLY READABLE PHASE STRUCTURE HAVING TRACKS WITH DIFFERENT PHASE DEPTHS AND APPARATUS FOR READING SUCH A RECORD CARRIER

[75] Inventor: Josephus J. M. Braat, Eindhoven, Netherlands

[73] Assignee: U.S. Philips Corporation, New York, N.Y.

[ * ] Notice: The portion of the term of this patent subsequent to Jun. 19, 2001 has been disclaimed.

[21] Appl. No.: 569,546

[22] Filed: Jan. 10, 1984

Related U.S. Application Data

[63] Continuation of Ser. No. 419,640, Sep. 17, 1982, abandoned, which is a continuation of Ser. No. 214,538, Dec. 8, 1980, abandoned, which is a continuation of Ser. No. 925,433, Jul. 17, 1978, abandoned.

[30] Foreign Application Priority Data

Apr. 3, 1978 [NL] Netherlands .......................... 7803517

[51] Int. Cl.[5] .......................... G11B 7/08; G11B 7/24
[52] U.S. Cl. .................................... 369/109; 369/275.1; 369/44.11
[58] Field of Search .................................. 369/43–46, 369/100, 109–112, 275; 358/342

[56] References Cited

U.S. PATENT DOCUMENTS

| | | |
|---|---|---|
| 3,348,217 | 10/1967 | Snapper . |
| 3,379,095 | 4/1968 | Kaprelian . |
| 3,396,266 | 8/1968 | Max et al. . |
| 3,503,050 | 3/1970 | Schools . |
| 3,624,278 | 11/1971 | Hecksher . |
| 3,703,724 | 11/1972 | Thomas . |
| 3,855,426 | 12/1974 | Bouwhuis . |
| 3,931,439 | 1/1976 | Korpel . |
| 4,006,293 | 2/1977 | Bouwauis et al. .................. 369/109 |
| 4,038,524 | 7/1977 | Puech et al. ...................... 369/275.4 |
| 4,041,530 | 8/1977 | Kramer et al. . |
| 4,057,833 | 11/1977 | Braat ............................. 369/109 X |
| 4,065,786 | 12/1977 | Stewart . |
| 4,084,185 | 4/1978 | de Lang et al. . |
| 4,085,423 | 4/1978 | Tsunoda . |
| 4,161,752 | 7/1979 | Basilico . |
| 4,209,804 | 6/1980 | Dil ............................... 369/109 X |
| 4,385,372 | 5/1983 | Drexler ............................ 369/109 |
| 4,455,632 | 6/1984 | Braat .............................. 369/45 |
| 4,556,967 | 12/1985 | Braat ............................. 369/109 |

OTHER PUBLICATIONS

Sheng, P., "Theoretical Considerations of Optical Diffraction from RCA Videodisc Signals", RCA Review, vol. 39, Sep. 1978, pp. 512–555.

Dil et al., Journal of the Optical Society of America, vol. 69, No. 7, Sep. 1979, pp. 950–956 and 958–960.

*Primary Examiner*—Robert Weinhardt
*Attorney, Agent, or Firm*—Leroy Eason

[57] ABSTRACT

A record carrier having information stored thereon in tracks comprised of areas separated from each other in the track direction by intermediate regions which are optically distinguishable from the areas. The areas in adjacent tracks have a different phase depth and are therefore also optically distinguishable from each other so that the tracks may be crowded closer together. A player is also disclosed having two detectors offset from each other in the direction of the tracks and producing signals that are alternately added and subtracted to produce a tracking signal.

18 Claims, 4 Drawing Sheets

RECORD CARRIER WITH OPTICALLY READABLE PHASE STRUCTURE HAVING TRACKS WITH DIFFERENT PHASE DEPTHS AND APPARATUS FOR READING SUCH A RECORD CARRIER

This is a continuation of abandoned application Ser. No. 419,640, filed Sep. 17, 1982, which is a continuation of abandoned application Ser. No. 214,538, filed Dec. 8, 1980 which in turn is a continuation of abandoned application Ser. No. 925,433 filed Jul. 17, 1978.

The invention relates to a record carrier which contains information in an optically readable structure which comprises areas arranged in information tracks and separated from each other along the tracks by intermediate areas or regions, the areas being optically distinct from the intermediate regions and the lands between the information tracks. The invention also relates to apparatus for reading such a record carrier.

In the case of a round disc-shaped record carrier the information tracks may comprise a multitude of concentric tracks, or alternatively, a multitude of quasi-concentric tracks which are linked to each other to define a spiral track.

Such a record carrier is inter alia known from: "Philips Technical Review"33, no. 7, pages 178-190. In this record carrier a (color) television program is encoded in the spatial frequency of the areas and in the lengths of the areas. The width of the information tracks, and thus the width of the areas, is for example 0.5 $\mu$m, the track period in the radial direction is for example 1.7 $\mu$m, and the average length of the areas for example 0.5 $\mu$m. In an annular area with an inner radius of 6.5 cm and an outer radius of 14 cm it is then possible to store a television program of approximately 30 minutes.

For certain programs, for example feature films, a longer playing time is desired. A longer playing time could be achieved by arranging the information tracks more closely to each other.

When the record carrier is read care must be taken that the center of the read spot which is formed on the information structure coincides with the middle of the track portion to be read. Otherwise the modulation depth of the signal being read is small and cross-talk may occur between adjacent tracks. Therefore, a radial error signal is derived during reading that provides an indication about the position of the read spot relative to the middle of the track portion to be read. In a servo system the radial position of the read spot is corrected with the aid of this error signal. For the generation of the radial error signal use is made of the grating-shaped structure of the adjacent information tracks in the radial direction. The optical read system with which the information structure is read is adapted to the information structure to be read. This means that the wavelength of the read beam and the numerical aperture of the read objective are selected in such a way that the areas with the highest spatial frequency, the areas of the inner track in the case of a round disc-shaped record carrier, can still be read with satisfactory discrimination. For a specific read system a compromise promise should be made in respect of the radial spatial frequency. The radial spatial frequency is selected so that a certain playing time is obtained, while the crosstalk between the tracks remains within a certain limit and the radial error signal is still sufficiently large. The radial track period of 1.7 $\mu$m stated in the foregoing is valid for a wavelength of $\lambda = 0.63$ $\mu$m and a numerical aperture N.A. = 0.45. If the radial spatial frequency were increased, for example, by a factor 2 for doubling the playing time, this spatial frequency would be situated near the cutoff frequency of the optical system, and radial positional errors of the read spot could only be detected with difficulty.

Furthermore, the read spot is larger than the width of the information tracks. If the radial period of the information track were reduced, a substantial portion of the read radiation would be incident on the tracks adjacent the track to be read. This would give rise to substantial crosstalk between the information tracks, even if the read spot were centered correctly relative to the track to be read.

It is the object of the present invention to increase the information density of a record carrier, while avoiding the afore-mentioned disadvantages. The invention is then embodied in the record carrier and in the apparatus for reading the record carrier.

The record carrier in accordance with the invention is characterized in that the adjacent information tracks differ from each other in that they comprise areas with a first phase depth and areas with a second phase depth respectively.

The information is then contained in two structures of different phase depth. The phase depth is defined as the phase difference between a zero-order subbeam and the higher-order subbeams into which the read beam is split by the information structure. Each phase depth then corresponds to a specific arrangement of the detection system with which the relevant structure can be read in an optimum manner. A deep phase structure is read in an optimum manner by detecting the total intensity over the entire pupil of the read objective, which is referred to herein as the full aperture detection mode. The shallower phase structure is read in an optimum manner by determining the difference of the intensities in two tangentially different pupil halves, which is referred to herein as differential detection mode. By the use of two different phase depths and of different detector arrangements, the radial period of the information track can be reduced by for example a factor 2, while the information tracks can be read with satisfactory discrimination.

If allowance were merely made for the phase differences between zero-order and the higher-order subbeams, a phase depth of $\pi$ radians could be selected for the deep tracks and a phase depth of $$\frac{\pi}{2}$$

radians for the shallow tracks. However, for a phase depth of $$\frac{\pi}{2}$$

radians, the radiating energy in the higher-order subbeams is very low, so that the detector signals are also very small. Therefore, in practice a phase depth slightly greater than $$\frac{\pi}{2}$$

radians is selected for the shallow tracks.

A preferred embodiment of a record carrier in accordance with the invention is therefore characterized in that the first phase depth is approximately $\pi$ radians and the second phase depth approximately $$\frac{2\pi}{3}$$

radians.

It is also possible to attribute a phase depth, namely a phase depth of $\pi$ radians, to an information structure which comprises radiation-absorbing areas and radiation-transmitting or radiation-reflecting intermediate areas, which information structure is referred to as an amplitude structure. One of the two tracks in the record carrier in accordance with the invention may comprise such an amplitude structure.

Preferably, the tracks with a large phase depth and those with a small phase depth comprise pits or hills. The advantage of a record carrier with pits or hills is that it can be manufactured rapidly in large quantities using known pressing techniques.

In the case of an information structure comprising pits or hills the phase depth defined hereinbefore as the phase difference between the servo-order subbeam and the higher-order subbeams is related to a geometric phase depth. The geometric phase depth $\phi$ for a reflecting information structure is given by:

$$\phi = 2 \times 2\pi \frac{d}{\lambda}$$

radians, where d is the geometric depth of the pits and $\lambda$ the wavelength of the read beam. For a radiation-transmitting information structure $$\phi = 2\pi \frac{d}{\lambda}$$

radians.

In comparison with a radiation-transmitting information structure a reflecting information structure has the advantage that during reading the elements of the optical read apparatus are all located on one side of the record carrier and are partly transversed two times by the read beam.

A record carrier with a reflecting information structure may further be characterized in that the areas with a phase depth of $\pi$ radians are constituted by pits with a geometric depth of approximately $\frac{1}{4}\lambda$ and the areas with a phase depth of $$\frac{2\pi}{3}$$

radians by pits with a depth of approximately $\frac{1}{6}\lambda$. $\lambda$ being the wavelength of the read beam.

During reading of the record carrier in accordance with the invention the signal from the one detector arrangement and the signal from the second detector arrangement should alternately be transferred to an electronic circuit in which the signals are further processed. The signal which has been read is ultimately displayed, for example by means of a television set, or rendered audible. The modulation transfer functions (M.T.F) for the read systems with the different detector arrangements differ slightly. If the information is stored in digitized form the alternation of the transfer functions will not be noticeable in the signal which is ultimately supplied by the read apparatus. If the information is recorded in a different manner, for example in the form of a frequency-modulated signal, the alternation between the modulation transfer functions may become noticeable. One transfer function will for example give rise to different gray shades or a different color saturation in the television picture than the other transfer function. In the case of an audio signal the alternation between the transfer functions may become audible as an undesired frequency.

If a television program is stored in the record carrier, containing for example one television image per revolution, the variation in gray shades or color saturation will give rise to flicker with a frequency of 12.5 Hz in the television picture at a speed of rotation of 25 revolutions/second. Flicker of this frequency is still perceptible to the human eye and is consequently annoying.

In order to render this effect invisible, in accordance with a further characteristic feature of a record carrier in accordance with the invention, consecutive track portions within a track differ from each other in that they comprise areas with a first phase depth and areas with a second phase depth respectively.

In the case of a television program these track portions each time contain the information of one television line. If the television picture consists of 625 lines, switching between the one read system and the other is effected at a frequency in the order of 7.5 KHz. Flicker of such a high frequency is no longer visible.

To ensure a correctly timed switching from the one detector arrangement to the other during reading of a record carrier, in accordance with a further characteristic feature, a pilot signal may be stored in addition to an information signal, which pilot signal marks the transitions between the areas with the first phase depth and the areas with the second phase depth and vice-versa.

This step may be used when for example only an audio signal is recorded in the record carrier.

If a television signal is recorded, the field synchronizing pulses or the picture synchronizing pulses may be employed for switching over, and no separate pilot signal need be recorded.

An apparatus for reading the record carrier, which apparatus comprises a radiation source which produces a read beam, an objective system for focussing the read beam to a read spot on the information layer of the record carrier, and a radiation-sensitive detection system for the conversion of the read beam which has been modulated by the information structure into an electrical signal, is characterized in that the detection system comprises two radiation-sensitive detectors which are disposed in the far field of the information structure each on one side of a line which is effectively transverse to the track direction, that the outputs of the detectors are connected to two inputs of a first electronic circuit in which the detector signals are combined additively in first time intervals and subtractively in second time intervals, that the output of this circuit is connected to the input of a second electronic circuit in which a switching signal is derived from the signal read from the record carrier, which switching signal is applied to a control input of the first electronic circuit and determines the said time intervals.

The line on both sides of which the detectors are arranged being "effectively transverse to the track direction" is to be understood to mean that the projection of this line in the plane of the information structure is transverse to the track direction.

An apparatus which is equipped with a servo system for keeping the read spot positioned at the middle of an information track, which servo system comprises a radiation-sensitive detection system for the generation of a positional error signal, a control circuit for the conversion of said signal into a control signal for an actuator with which the radial position of the read spot can be varied, is characterized in that between the detection system and the control circuit there is included a switchable inverter stage, of which a control input is connected to the output of the second electronic circuit at which the switching signal appears.

Thus it is prevented that during read-out of a first track whose areas have a specific phase depth the read spot is directed to a second track whose areas have a different phase depth.

Figure 2:
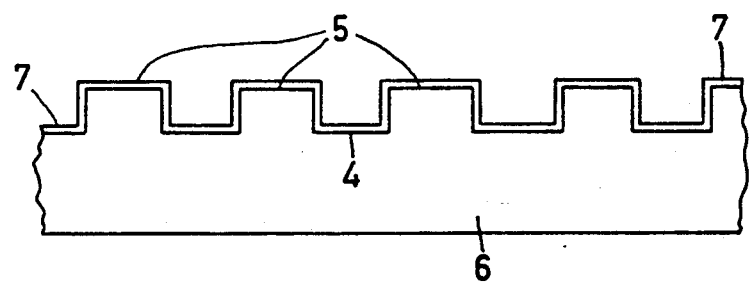
Figure 3:
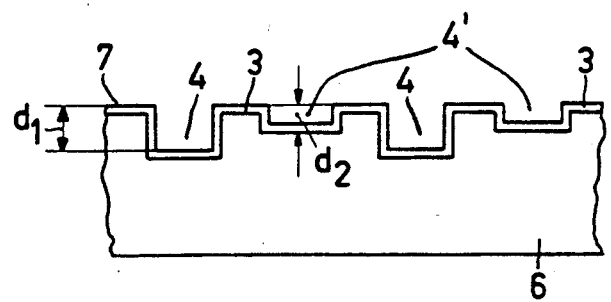
Figure 4:
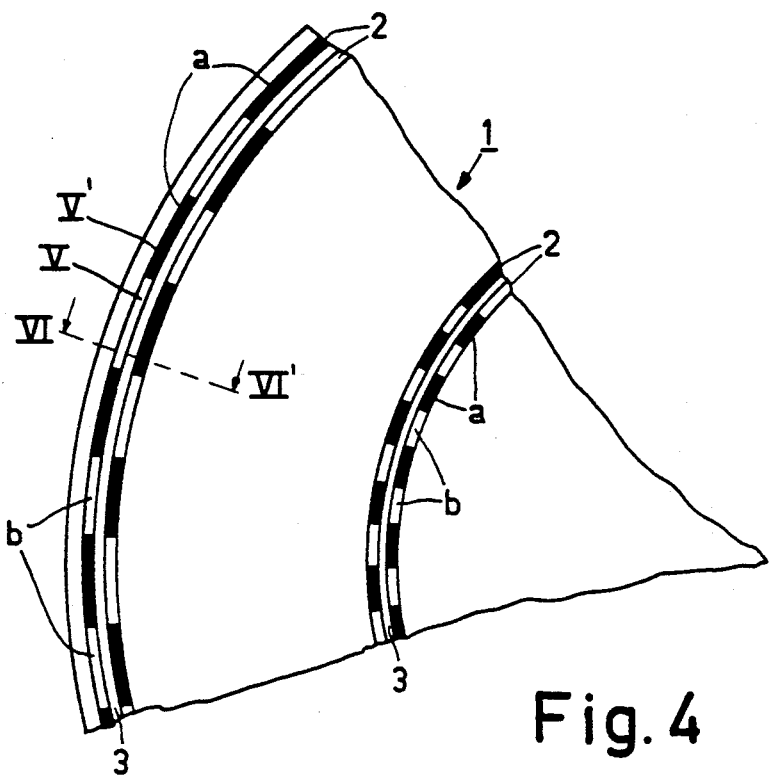
Figure 5:
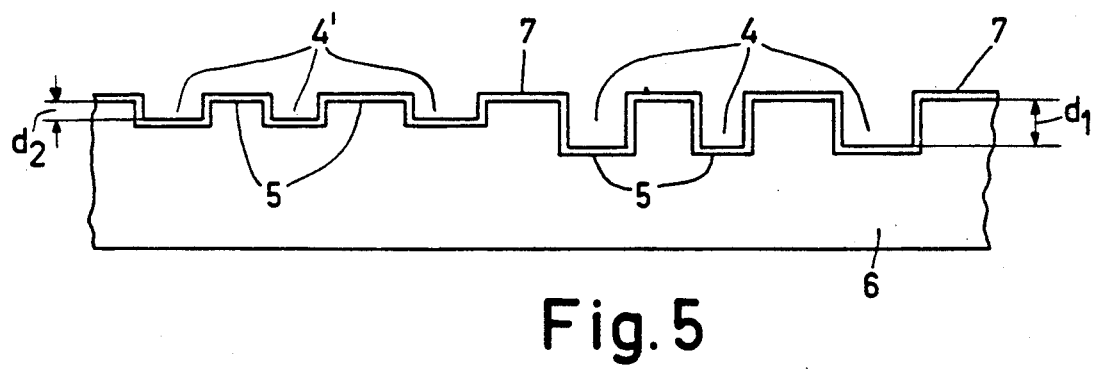
Figure 6:
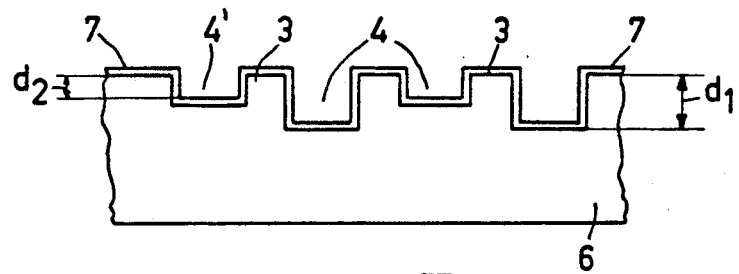
Figure 7:
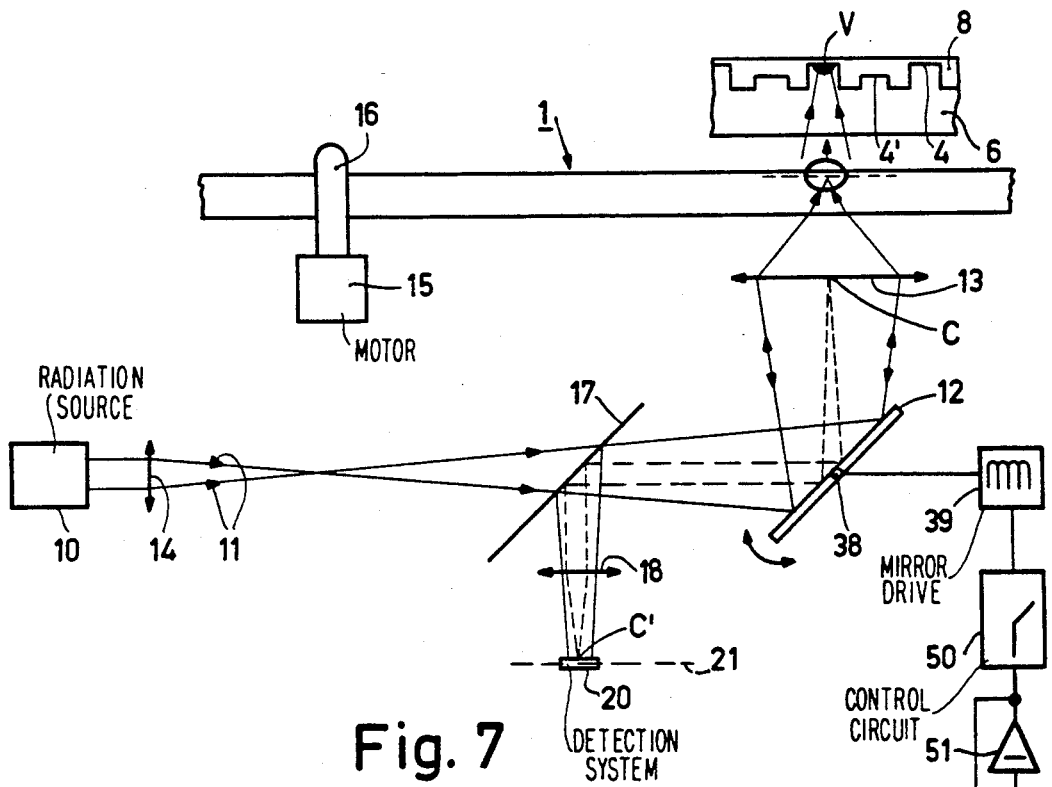
Figure 8:
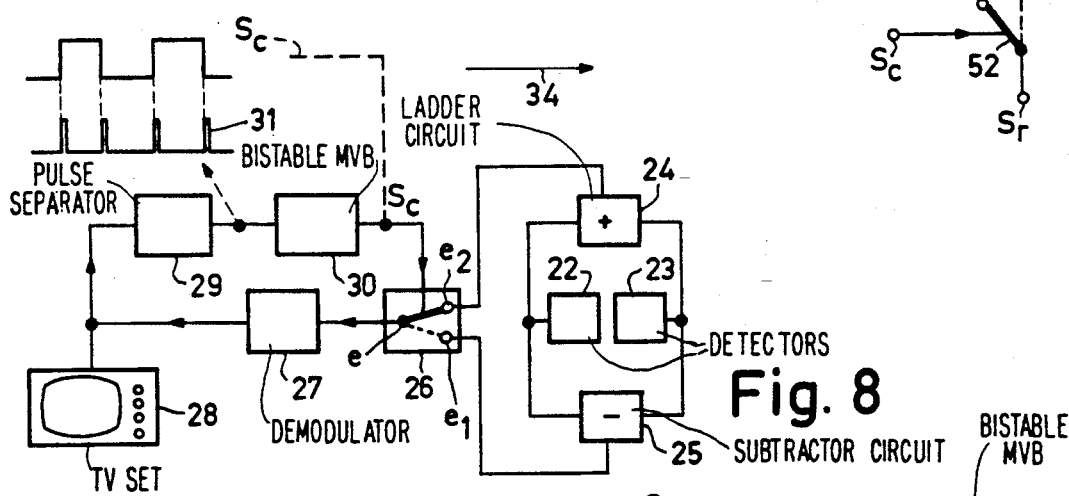
Figure 9:
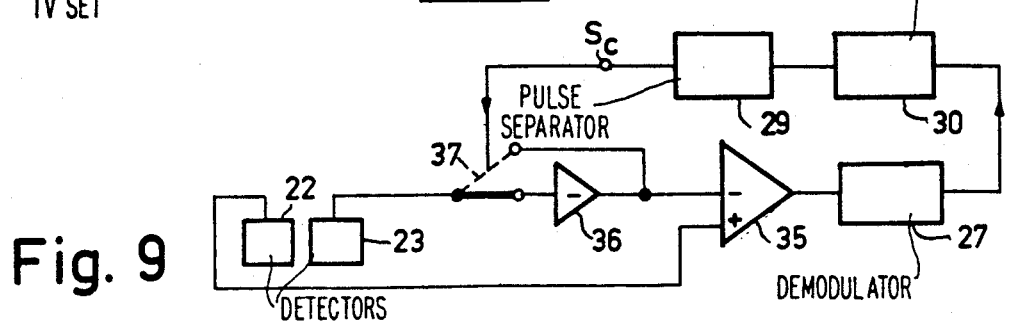
Figure 10:
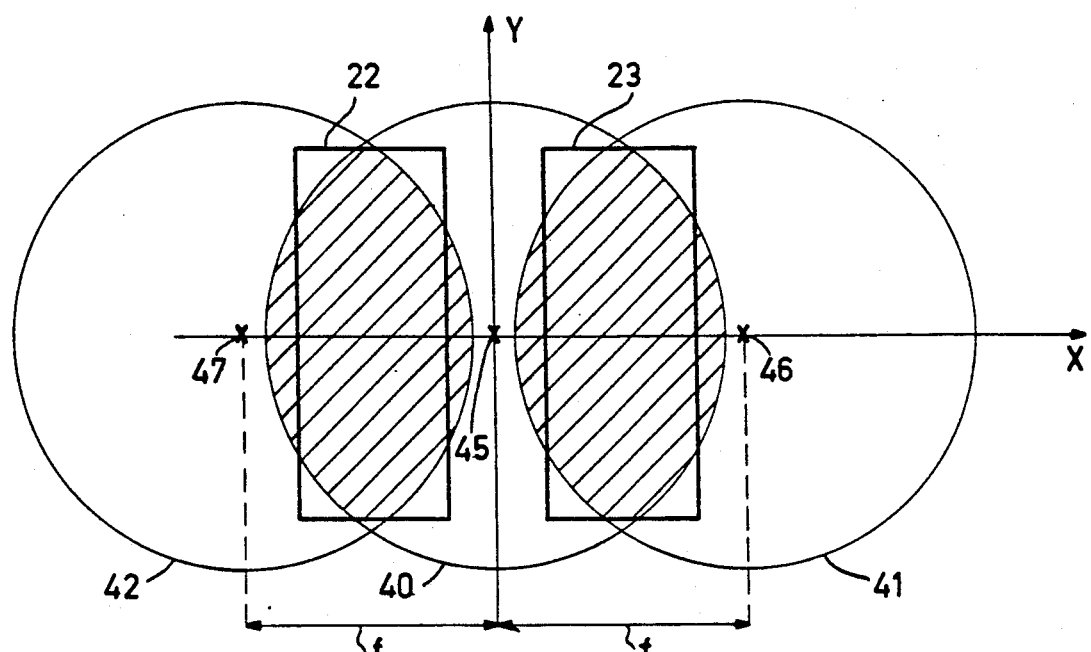
Figure 11:
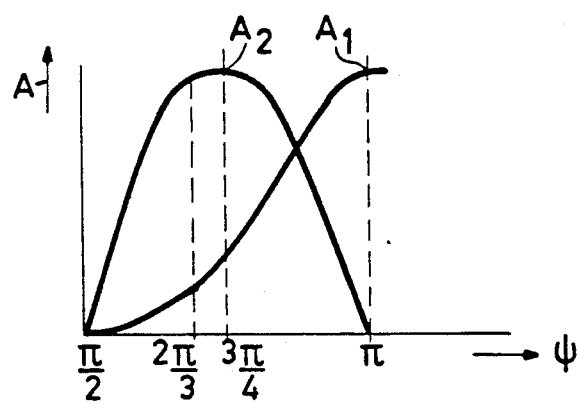
Figure 12:
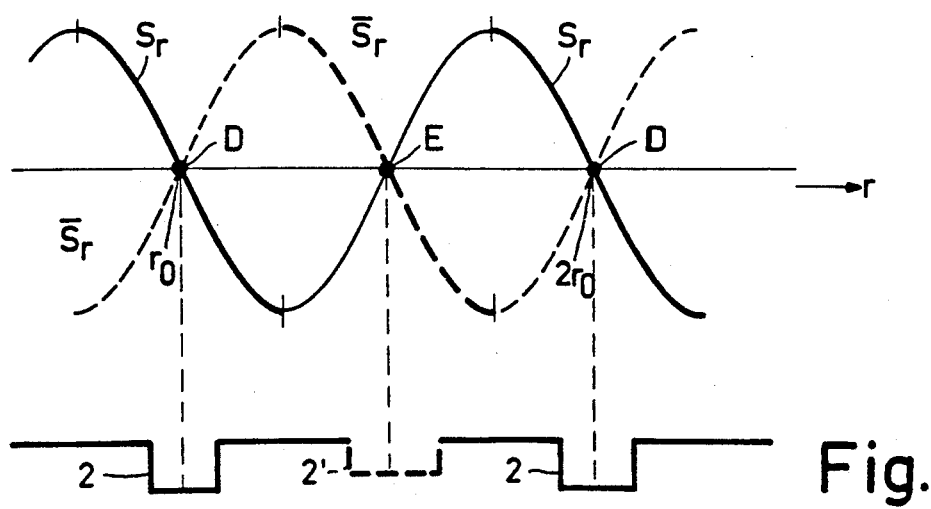

The invention will now be described in more detail with reference to the drawing. In the drawing:

FIG. 1 is a plan view of a part of a first embodiment of a record carrier in accordance with the invention, FIG. 2 is a tangential cross-section of this record carrier, FIG. 3 is a radial cross-section of this record carrier, FIG. 4 is a plan view of a part of a second embodiment of a record carrier in accordance with the invention, FIG. 5 is a tangential cross-section of this record carrier, FIG. 6 is a radial cross-section of this record carrier, FIG. 7 shows an embodiment of a read apparatus in accordance with the invention, FIG. 8 shows the arrangement of the detectors, and a first example of the electronic circuit for processing the detector signals, FIG. 9 shows a second example of this electronic circuit, FIG. 10 shows the arrangement of the detectors with respect to the different diffraction orders, FIG. 11 shows the variation of the amplitude of the signal which has been read as a function of the phase depth, and FIG. 12 represents the shape of a radial error signal in one example of a servo system for the radial position of the read spot.

In these Figures similar elements always bear the same reference numerals.

FIGS. 1, 2 and 3 show a first embodiment of a record carrier in accordance with the invention, FIG. 1 shows the record carrier in plan view, FIG. 2 in tangential cross-section, taken on the line II—II in FIG. 1, and FIG. 3 in radial cross-section, taken on the line III—III in FIG. 1. The information is contained in a multitude of areas 4, for example pits in the substrate 6. These areas are arranged in accordance with tracks 2. Between the areas 4 the intermediate areas or regions 5 are located. The tracks 2 are separated from each other by narrow lands 3. The spatial frequency and, as the case may be, the lengths of the areas are determined by the information.

The areas of adjacent information tracks have different phase depths. As is shown in FIG. 3, the pits of a first track, a third track etc. are deeper than the pits 4' of the second track, the fourth track etc. The geometric depths of the pits 4 and 4' are designated $d_1$ and $d_2$. As a result of the different depths the first track, the third track etc. can be discriminated optically from the second track, the fourth track etc. These tracks may then be situated closely to each other.

In a realized embodiment of a record carrier in accordance with the invention the radial period of the information tracks was 0.85 μm, the width of these tracks 0.5 μm, and the width of the lands 3: 0.35 μm.

The information-carrying surface of the record carrier may be reflecting, for example in that a metallic layer 7, such as aluminum, is vacuum-deposited on said surface.

It is to be noted that in FIGS. 1, 2 and 3 the scale of the areas has been exaggerated for the sake of clarity.

FIG. 4 shows a part of a second embodiment of a record carrier in accordance with the invention in plan view. This Figure shows a larger part of the record carrier than FIG. 1, so that the individual areas are no longer visible. The information tracks are now divided into portions a and b, the portions a comprising pits of greater phase depth (areas with deeper pits) and the portions b areas of smaller phase depth.

In FIG. 5, which shows an enlarged tangential cross-section of a track taken on the line V—V' in FIG. 4, the pits of the depth $d_2$ are again designated 4' and the pits of the depth $d_1$ are designated 4. FIG. 6 is a radial cross-section of the second embodiment of the record carrier, taken on the line VI—VI' in FIG. 4.

U.S. Pat No. 3,894,179, issued Jul. 8, 1975 describes a method of optically writing information in a record carrier. A photoresist layer is then exposed intermittently in accordance with information to be written. By subsequent development and, as the case may be, etching, the exposed pattern thus obtained can be converted into a depth profile. By selecting a higher radiation intensity during writing of a first track, a third track etc. than during writing of a second track, a fourth track etc, a record carrier can be obtained of which the odd-numbered tracks comprise pits with a smaller phase depth.

FIG. 7 shows an embodiment of an apparatus for reading a record carrier in accordance with the invention. The round disc-shaped record carrier is shown in radial cross-section. Consequently, the information tracks are perpendicular to the plane of drawing. It has been assumed that the information structure is disposed on the upper side of the record carrier and is reflecting, so that reading is effected through the substrate 6. The information structure may be covered with a protective layer 8. With the aid of a spindle 16, which is driven by a motor 15, the record carrier can be rotated.

A radiation source 10, for example a helium-neon laser or a semiconductor diode laser, produces a read beam 11. This beam is reflected by a mirror 12 to an objective system 13, which is schematically represented by a single lens. In the path of the read beam an auxiliary lens 14 is included, which ensures that the pupil of the objective system is filled in an optimum manner. Then a read spot V of minimum dimensions is formed on the information structure.

The read beam is reflected by the information structure and, as the record carrier rotates, it is modulated in accordance with the sequence of the areas in the track to be read. By moving the read spot and the record carrier relative to each other in the radial direction, the entire information area can be scanned.

The modulated read beam again passes through the objective system and is reflected by the mirror 12. The radiation path includes means for separating the modulated and the unmodulated read beam. These means may for example comprise a polarization-sensitive splitter prism and a quarter lambda plate (lambda is the wavelength of the read beam). For the sake of simplicity it has been assumed that in FIG. 7 the said means are constituted by a semitransparent mirror 17. This mirror reflects the modulated read beam to a radiation-sensitive detection system 20.

The detection system is disposed in the so-called "far field of the information structure", i.e. in a plane in which the center of the subbeams formed by the information structure, in particular those of the zero-order subbeams and of the first-order subbeams, are separated. The detection system may be disposed in the plane 21 in which an image of the exit pupil of the objective system 13 is formed by the auxiliary lens 18. In FIG. 7 the image C' of the point C of the exit pupil is represented by dashed lines.

The detection system 20 comprises two detectors 22 and 23. These detectors are shown in plan view in FIG. 8. In this Figure, the direction in which an information track is scanned is indicated by the arrow 34. When the areas of a track being read have a large phase depth, for example of $\pi$ radians, the output signals of the detector should be added, while if the areas of the track being read have a small phase depth, for example $2\pi/3$ radians, the signals from the detector should be subtracted from each other.

For this purpose, as is shown in FIG. 8, the detectors 22 and 23 may be connected both to an adder circuit 24 and to a subtractor circuit 25. The outputs of the circuits 24 and 25 are connected to the two input terminals $e_1$ and $e_2$ of a switch 26, which has one master terminal e. Depending on the control signal $S_c$ applied to its control input, this switch transfers either the sum signal from detectors 22 and 23 or the difference signal from these detectors to a demodulation circuit 27. In this circuit the read-out signal is demodulated and rendered suitable for reproduction with for example a television set 28.

For controlling the switch 26 a control signal is to be generated. In the record carrier a pilot signal may be recorded in addition to the actual information signal, which pilot signal marks the positions on the record carrier where a transition from the areas with a first phase depth to the areas with a second phase depth is located. If a television signal is recorded, one television picture being recorded per track, the picture synchronizing pulses or the field synchronizing pulses contained in the actual television signal may be used for generating the control signal $S_c$. Said pulses are always well-identifiable.

If the information of the lines of a television picture is contained in the track portions a and b in accordance with FIG. 4, the line synchronizing pulses 31, as is shown in FIG. 8, can be separated from the signal from the demodulation circuit 27 in the line synchronizing pulse separator 29. In the circuit 30, which is for example a bistable multivibrator, the pulses 31 are converted into a control signal $S_c$ for the switch 26, so that this switch is changed over every time after reading one television line.

If each track of the information structure contains only one type of areas the element 29 is a picture synchronizing pulse separator, and the switch 26 is changed over every time after reading one track, or two television fields.

FIG. 9 shows a second example of an electronic circuit with which the output signals of the detectors 22 and 23 can alternately be combined additively and subtractively. These detectors are now connected to a first and a second input of a differential amplifier 35. The detector 22 is connected directly to this amplifier, while in the connection between the detector 23 and the differential amplifier an inverter 36 and a switch 37 are included, so that the signal from the detector 23 can be applied to the differential amplifier in inverted or non-inverted form.

Now the physical background of the invention will be discussed in more detail. The information structure, which comprises adjacent tracks which tracks comprise areas and intermediate areas, behaves as a two dimensional diffraction grating. This grating splits the read beam into a zero-order subbeam, a number of first-order subbeams and a number of higher-order subbeams. A part of the radiation re-enters the objective system after reflection at the information structure. In the plane of the exit pupil of the objective system, or in a plane in which an image of said exit pupil is formed, the centers of the subbeams are separated. FIG. 10 shows the situation in the plane 21 of FIG. 7.

The circle 40 with the center 41 represents the cross-section of the zero-order subbeam in this plane. The circles 41 and 42 with the centers 46 and 47 represent the cross-section of the (+1,0) and (−1,0) order subbeams which are diffracted in the tangential direction. The X-axis and the Y-axis in FIG. 10 corresponds to the tangential direction, or the track direction, and the radial direction, or the direction transverse to the track direction, on the record carrier. The distance f from the centers 46 and 47 to the Y-axis is determined by: $\lambda/p$, where p represents the local spatial period of the areas in the track portion to be read and $\lambda$ the wavelength of the read beam.

For reading the information use is made of the phase variations of the subbeams of the order (+1,0) and (−1,0) relative to the zero-order subbeams. In the hatched areas in FIG. 10 these first-order subbeams overlap the zero-order subbeams and interference occurs. The phase of the first-order subbeams vary as a result of the movements of the read spot in the tangential direction relative to the information track. This results in intensity variations in the exit pupil or in its image, which variations can be detected by the detectors 22 and 23.

When the center of the read spot coincides with the center of an area a certain phase difference $\psi$ is produced between the first-order subbeams and the zero-order subbeams. This phase difference is called the phase depth of the information structure. At the transition of the read spot from a first area to a second area the phase of the (+1,0) order subbeam increases by $2\pi$. Therefore, it may be said that during a movement of the read spot in the tangential direction the phase of said subbeam relative to the zero-order subbeam changes with $\omega t$. Herein $\omega$ is a time frequency which is determined by the spatial frequency of the areas and by the speed with which the read spot moves over the track.

The phases $\phi\,(+1,0)$ and $\phi\,(-1,0)$ of the first-order subbeams relative to the zero-order subbeams may be represented by:

$$\phi(+1,0) = \psi + \omega t$$

$$\phi(-1,0) = \psi - \omega t$$

The intensity variations as a result of interference of the first order subbeams with the zero-order subbeam are converted into electrical signals by the detectors 22 and 23. The time-dependent output signals $S_{23}$ and $S_{22}$ of the detectors 23 and 22 may be represented by:

$$S_{23} = B(\psi) \cos(\psi + \omega t)$$

$$S_{22} = B(\psi) \cos(\psi - \omega t)$$

In these formulas $B(\psi)$ is a factor which is proportional to the geometric depth of the pits. It may be assumed that $B(\psi)$ is zero for $$\psi = \frac{\pi}{2}.$$

As is indicated in FIG. 8, the signals $S_{22}$ and $S_{23}$ are added to each other, yielding:

$$S_{24} = S_{22} + S_{23} 2B(\psi) \cdot \cos \psi \cdot \cos \omega t.$$

The signals $S_{22}$ and $S_{23}$ are also subtracted from each other, yielding:

$$S_{25} = S_{22} - S_{23} = -2B(\psi) \cdot \sin \psi \cdot \sin \omega t.$$

It follows that for a phase depth $\psi = \pi$ rad the amplitude of the signal $S_{24}$, i.e. $B(\psi) \cdot \cos \psi$ is a maximum and that of the signal $S_{25}$, i.e. $B(\psi) \sin \psi$, is a minimum. For a phase depth $\psi = 3\pi/4$ rad $B(\psi) \sin \psi$ is a maximum.

FIG. 11 represents the variation of the amplitude $A_1$ (i.e. $B(\psi) \cos \psi$) of the signal $S_{24}$, and that of the amplitude $A_2$ (i.e. $B(\psi)$) of the signal $S_{25}$ as a function of the phase depth. For $\psi = \pi/2$ radians both $A_1$ and $A_2$ are zero. $A_1$ reaches a maximum for $\psi = \pi$ radians. The maximum for $A_2$ is situated at $$\psi = \frac{3\pi}{4}$$

radians. However, at this phase depth $A_2$ still also has a substantially value. Therefore, in practice the value $$\psi = \frac{2\pi}{3}$$

is selected for the small phase depth. The amplitude $A_2$ at the phase depth $$\psi = \frac{2\pi}{3}$$

is not significantly smaller that the amplitude $A_2$ at a phase depth $$\frac{3\pi}{4}.$$

However, the amplitude $A_1$ changes comparatively strongly between the phase depths $$\psi = \frac{3\pi}{4} \text{ and } \psi = \frac{2\pi}{3}.$$

Thus, when during reading the signals from the detectors are added to each other, the pits with a phase depth of $\pi$ radians are read in an optimum manner. Pits with a phase depth of $2\pi/3$ radians, i.e. the pits of the adjacent tracks, are then virtually disregarded, so that little cross-talk occurs. Conversely, it is obvious that when during reading the signals form the detectors are subtracted from each other, the pits with a phase depth of $2\pi/3$ radians are read in an optimum manner, while the pits with a phase depth of $\pi$ rad are then disregarded.

The values for the phase depths $\omega = \pi$ radians and $$\psi = \frac{2\pi}{3}$$

radians given in the foregoing are not strict values. Deviations of the order of $\pm 5\%$ from the large phase depth and of the order of $\pm 15\%$ for the smaller phase depth are permissible. It will be evident from FIG. 11 that the phase depth for the deeper tracks is more critical than for the shallow tracks. The slope for $A_2$ at $\psi = \pi$ radians is steeper that the slope for $A_1$ at $$\psi = \frac{2\pi}{3}$$

radians.

So far, only the first-order subbeams have been discussed. It is evident that the information structure will diffract the radiation also to higher orders. However, the radiation energy of the higher diffraction orders is low and the diffraction angles are such that only a small part of the higher-order beams falls within the pupil of the objective system 13. The influence of the higher-order subbeams may therefore be neglected.

During reading the read spot should remain accurately centered on the track to be read. For this purpose the read apparatus comprises a fine control for the radial position of the read spot. As is shown in FIG. 7, the mirror 12 may be arranged so as to be rotatable. The axis of rotation 38 of the mirror is perpendicular to the plane of the drawing, so that by rotating the mirror 12 the read spot is radially shifted. The rotation of the mirror is obtained by means of the drive element 39. This element may take different forms; it is for example an electromagnetic element as shown in FIG. 7, or a piezoelectric element. The drive element is controlled by a control circuit 50 to whose input a radial error signal $S_r$ is applied, i.e. a signal which provides an indication about a deviation from the position of the read spot relative to the middle of the track.

For generating the signal $S_r$ various methods have been proposed. As is described in U.S. Pat. No. 3,876,842, issued Apr. 8, 1975 two servo spots may be projected on the information structure in addition to the read spot. These spots are positioned so relative to each other, that when the center of the read spot exactly coincides with the middle of the track to be read, the centers of the servo spots are situated at the two edges of said track. For each servo spot there has been provided a separate detector. The difference of the signals from these detectors is determined by the magnitude and the direction of the radial positional error of the read spot.

In FIG. 12 the continuous line represents the variation of the signal $S_r$ as a function of the radial position r of the read spot, when there are provided deep tracks only (tracks with areas having a large phase depth only). When the read spot is located exactly above a deep track, i.e. at the position $r_o$, $2r_o$, etc., the signal $S_r$ is zero. The servo system for tracking is designed in such a way that for a negative value of $S_r$ the tilting mirror 12 in FIG. 17 is rotated counter clockwise, so that the center of the read spot is positioned exactly on the middle of the deep track 2. In the case of a positive value of $S_r$ the mirror 12 is rotated clockwise. The points D in FIG. 12 are the stable points for the servo system.

In a record carrier in accordance with the invention there are moreover provided shallow tracks 2' between the deep tracks 2. The point E on the curve for $S_r$ corresponding to the center of the track 2' is an unstable point. If the read spot were located slightly to the right of the center of the track 2', i.e. if $S_r$ were positive, the mirror we would be rotated clockwise and the read spot would move further to the right. In a similar way, in the case of deviation to the left of the position of the read spot, this spot would be moved further to the left. Without further steps the read spot could not remain positioned on a shallow track 2', but the read spot would always be directed to a deep track.

For reading a shallow track or track portion, the signal $S_r$, in accordance with the invention, is inverted before being applied to the control circuit 50. The inverted signal $\bar{S}_r$ is represented by the dashed curve in FIG. 12. The point E on the curve for $\bar{S}_r$ corresponding to the middle of the track 2' is a stable point and the points D on this curve are unstable points.

In the apparatus in accordance with FIG. 7 a combination of an inverter 51 and a switch 52 has been provided. As a result of this the signal $S_r$ may be applied to the controller 50 in inverted or non-inverted form. The switch 52 is controlled by the signal $S_c$ in synchronism with the switch 26 of FIG. 8. During reading of a deep track signal $S_r$ is not inverted and during reading of a shallow track it is inverted. During reading of a track 2 the heavy part of the curve for $S_r$ is used and during reading of a track 2' the heavy part of the dashed curve for $S_r$.

A radial error signal can also be generated during reading by radially moving the read spot and the track to be read periodically relative to each other with a small amplitude, for example 0.1 times the track width, and with a comparatively low frequency of for example 30 kHz. The signal supplied by the information detectors then comprises an additional component whose frequency and phase are determined by the radial position of the read spot. The relative movement of the read spot and the track can be obtained by moving the read beam periodically in the radial direction. Alternatively, as is described in the U.S. patent application Ser. No. 442,396 filed Feb. 4, 1974, the information tracks may take the form of undulating tracks. A positional error signal thus generated should also be inverted when a shallow track is read.

Finally, a radial error signal can also be generated with the aid of two detectors which are disposed in the plane 21 on both sides of a line which is effectively parallel to the track direction, as described in for example German Patent Application 2,342,906, which has been laid open for public inspection.

By subtracting the output signals of the detectors from each other a radial error signal $S_r$ is obtained. Thus, a radial asymmetry of the radiation distribution in the pupil is determined. As a deep track, i.e. a track with a phase depth $\pi$ for the pits, gives a symmetrical variation over the pupil, this method is only suitable for determining a positional error of the read spot relative to a shallow track. The signal $S_r$ thus generated varies in accordance with the continuous curve in FIG. 12, but with the positions of the deep tracks 2 and the shallow tracks 2' being interchanged.

The servo system is now adapted to follow a shallow track. When a deep track is followed, the signal $S_r$ should be inverted again. This means that during reading of a deep track in fact a line midway between two shallow tracks is followed.

The detectors for reading the information (22 and 23 in FIG. 10) and those for generating the radial error signal (53 and 54 in FIG. 13) may be combined, in the form of four detectors which are disposed in the four different quadrants of the X-Y system. For reading the information the signals from the detectors in the first and the fourth quadrant are added to each other as well as the signals from the detectors in the second and the third quadrant. The sum signals thus obtained are either added to each other or subtracted from each other as described hereinbefore. For generating the radial error signal the signals from the detectors in the first and the second quadrant are first added to each other, as well as the signals from the detectors in the first and the fourth quadrant. The sum signals thus obtained are subtracted from each other, so that the signal $S_r$ is obtained.

The invention has been described on the basis of a reflecting record carrier. It is alternatively possible to use the invention for a record carrier with a phase structure which is read in transmission. If the phase structure comprises pits or hills respectively, these should be deeper or higher than the pits or hills of a reflecting record carrier.

Furthermore, the invention may also be utilized in a record carrier in the form of a tape. In that case the expression "radial direction" used hereinbefore should read: "the direction perpendicular to the track direction".

What is claimed is:

1. A record carrier comprising an information structure containing information adapted to be read with a beam of radiation of a single wavelength, said information structure having a plurality of adjacent information track portions each comprising a plurality of areas separated from each other along said track portion by intermediate regions having a different influence on the read beam than said areas, one track portion of a pair of said adjacent track portions containing areas of a first configuration which diffract the read beam of said single wavelength incident thereon into a zero order subbeam and a first order subbeam with a first phase difference therebetween and the other track portion of said pair containing areas of a second configuration which diffract the read beam of said single wavelength incident thereon into said zero and first order subbeams with a second phase difference therebetween which is different from said first phase difference.

2. The record carrier according to claim 1 wherein said record carrier is a disc and said track portions define turns of a spiral or concentric circles.

3. The record carrier according to claim 1 wherein said first phase difference is approximately $\pi$ radians and said second phase difference is approximately $\frac{2}{3}\pi$ radians.

4. The record carrier according to claim 1 or 2, wherein said information structure is reflective and said areas of said first configuration are pits having a geometric depth of approximately $\frac{1}{4}\lambda$ and said areas of said second configuration are pits having a geometric depth of approximately $\frac{1}{8}\lambda$, where $\lambda$ is said wavelength of said read beam.

5. The record carrier according to claim 1, 2 or 3, wherein in addition to said information, said information structure contains a pilot signal which marks transitions between the track portions containing said areas of said first configuration and the track portions containing said areas of said second configuration.

6. The record carrier according to claims 1 or 3, wherein said track portions form a plurality of generally parallel tracks with consecutive track portions in a given track alternately containing areas of said first and second configuration.

7. In a record carrier having a reflective information structure containing information stored therein in a form adapted to be read with a beam of radiation of a single wavelength, said optical structure including a plurality of adjacent information track portions each comprising a plurality of pits spaced along said track portion and separated from each other by intermediate regions which have a different influence on said read beam than the pits, the improvement wherein said pits in one of a given pair of adjacent track portions have a first geometrical depth equal to approximately $\frac{1}{4}\lambda$ and said pits in the other track portion of said pair have a second geometrical depth equal to approximately $\frac{1}{8}\lambda$, where $\lambda$ is the wavelength of said radiation beam.

8. A record carrier comprising an information structure adapted to be read with a beam of radiation of a single wavelength, said information structure having at least one pair of adjacent track portions, one track portion of said pair comprising a plurality of first information areas and the other track portion of said pair comprising a plurality of second information areas, said information areas being spaced along the respective track portion and separated by intermediate regions so as to modulate the radiation of said read beam in accordance with information stored thereby when scanned by the read beam, said first information areas in said one track portion having a configuration such as to optimize read out of the information in a full aperture detection mode and having minimal effect on read out of information in a differential detection mode, said second information areas in said other track portion having a configuration such as to optimize read out of the information in said differential detection mode and having a minimal effect on read out in said full aperture mode so as to reduce cross talk during read out of information from said track portions.

9. The record carrier according to claim 8 wherein said record carrier is a disc and said track portions define turns of a spiral or concentric circles extending about the center of said disc.

10. The record carrier according to claim 8 or 9 wherein said intermediate regions are reflective, said first information areas are non-reflecting, and said second information areas are pits.

11. The record carrier according to claim 8 or 9 wherein said information structure is reflective, said first information areas are pits having geometric depth of approximately $\frac{1}{4}\lambda$ and said second information areas are pits having a geometrical depth of approximately $\frac{1}{8}\lambda$, where $\lambda$ is the wavelength of said radiation.

12. An apparatus for reading a record carrier provided with an information structure containing optically readable information in the form of areas arranged along a plurality of adjacent information track portions and separated from each other along said track portions by intermediate regions which have a different influence on a read beam than the areas, the areas being adapted to diffract the read beam incident thereof into a zero order subbeam and a first order subbeam having a phase which is different from that of the zero order subbeam, the areas in adjacent track portions having different configurations such that the phase difference between said zero and first order subbeams diffracted by the areas of one of the adjacent track portions have a first phase difference which is different from the phase difference between said zero order and first order subbeams diffracted by the areas of the other of the adjacent track portions, said apparatus comprising a radiation source which produces a read beam, an objective system for focusing the read beam to a read spot on the information structure, and a radiation sensitive detection system for converting the read beam which has been modulated by the information structure into an electrical signal, the detection system comprising two radiation sensitive detectors which are disposed in the far field of the information structure each on one side of a line which is effectively transverse to the track direction, the outputs of the detectors being connected to inputs of a first electronic circuit in which the detector signals are added in first time intervals and subtracted in second time intervals, the output of the first electronic circuit being connected to an input of a second electronic circuit in which a switching signal is derived from the signal read from the record carrier, said switching signal being applied to a control input of the first electronic circuit and determining said time intervals.

13. The apparatus according to claim 12 including a servo system for keeping the read spot positioned at the middle of an information track portion, said servo system comprising a radiation-sensitive detection system for generating a positional error signal, a control circuit for converting said error signal into a control signal for an actuator with which the position of the read spot can be varied, and a switchable inverter stage included between the detection system and the control circuit, the inverter stage having a control input connected to the output of the second electronic circuit at which the switching signal appears.

14. An apparatus for reading information stored in a reflective information structure on a record carrier, the information structure having a plurality of adjacent track portions each comprised of a plurality of pits spaced along the track portion and separated from each other by intermediate regions which have a different influence on a read beam than said pits, said apparatus comprising means for producing a read beam of radiation of a single wavelength, means for focusing said read beam to a read spot on the information structure, means for producing relative movement between said record carrier and said read spot so that said read spot scans and is modulated by the pits, the pits in one track portion of a given pair of adjacent track portions of the information structure having a first geometrical depth equal to approximately one-quarter of said wavelength and the pits in the other track portion of said pair having a second geometrical depth equal to approximately one-eighth of said wavelength so that the pits in the respective track portions of said pair have a different influence on said read beam when scanned thereby, first means for converting the radiation of said read beam which has been modulated by pits of said first depth in said one track portion into a first electrical signal representative of information stored in said one track portion, said first means being insensitive to radiation of said read beam which has been modulated by the pits of said second depth in said other track portion, and second means for converting radiation of the read beam which has been modulated by the pits of said second depth in said other track portion into a second electrical signal representative of information stored in said other track portion, said second detecting means being insensitive to radiation of said read beam which has been modulated by said pits of said first depth in said one track portion.

15. An apparatus for reading an information structure on a record carrier, the information structure having at least one pair of adjacent track portions, one track portion of said pair comprising a plurality of first information areas and the other track portion of said pair comprising a plurality of second information areas, said information areas being spaced along the respective track portion and being separated from each other by intermediate regions, said first information areas being defined by pits of a first depth or hills of a first height and said second information areas being defined by pits of a second depth or hills of a second height which is smaller than said first depth or first height, respectively, said apparatus comprising means for producing a beam of radiation of a single wavelength, means for focusing said beam to a read spot on the information structure, means for producing relative movement between said record carrier and said read spot so that said read spot scans a given track portion and the radiation of the said beam is modulated by the information areas therein in accordance with information stored thereby, a pair of radiation sensitive detectors arranged in the path of said modulated radiation coming from the record carrier for converting said modulated radiation into corresponding electrical signals, means for adding said electrical signal so as to produce a first signal representative of information stored in said one track portion and means for subtracting said electrical signals so as to produce a second signal representative of information stored in said other track portion, said first information areas having a depth or height such as to optimize said first signal and minimize the effect of said first areas on said second signal and said second information areas having a depth or height such as to optimize said second signal and minimize the effect of said second areas on said first signal so as to reduce cross talk between said track portions.

16. The apparatus according to claim 15 wherein said information structure is reflective and said first information areas are defined by pits having a depth of approximately $\frac{1}{4}\lambda$ and said second information areas are pits having a depth of approximately $\frac{1}{8}\lambda$, where $\lambda$ is said wavelength of said radiation.

17. The apparatus according to claim 15 or 16 wherein said record carrier is a disc and said track portions define turns of a spiral or concentric circles extending about the center of said disc.

18. The apparatus according to claim 15 or 16 including switching means, coupled to said adding means and said subtracting means, for supplying at an output thereof said first signal or said second signal in dependence on which one of said track portions is being scanned by said read spot.

* * * * *